United States Patent Office 2,925,845
Patented Feb. 23, 1960

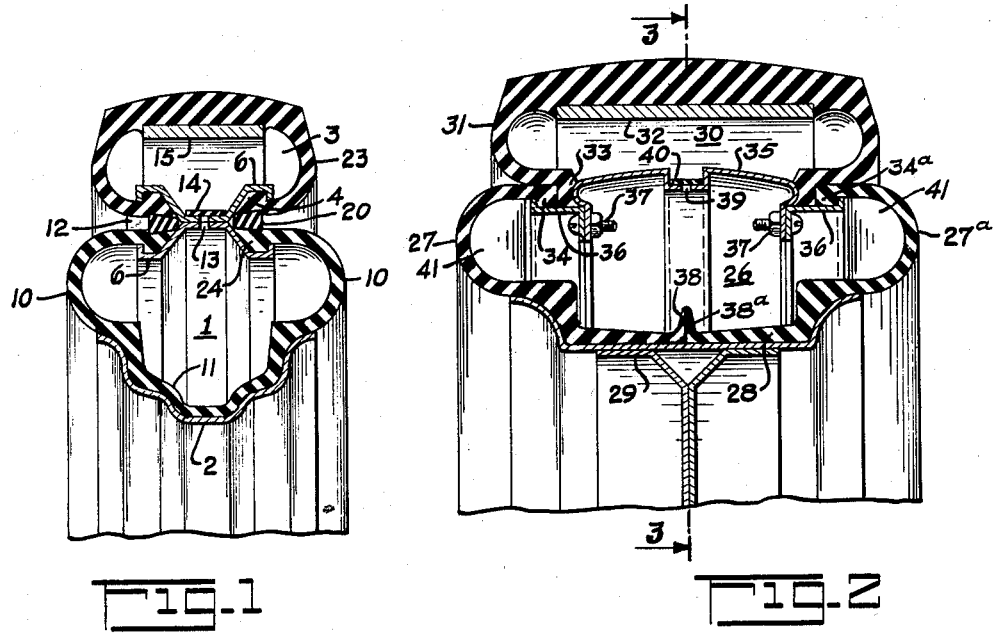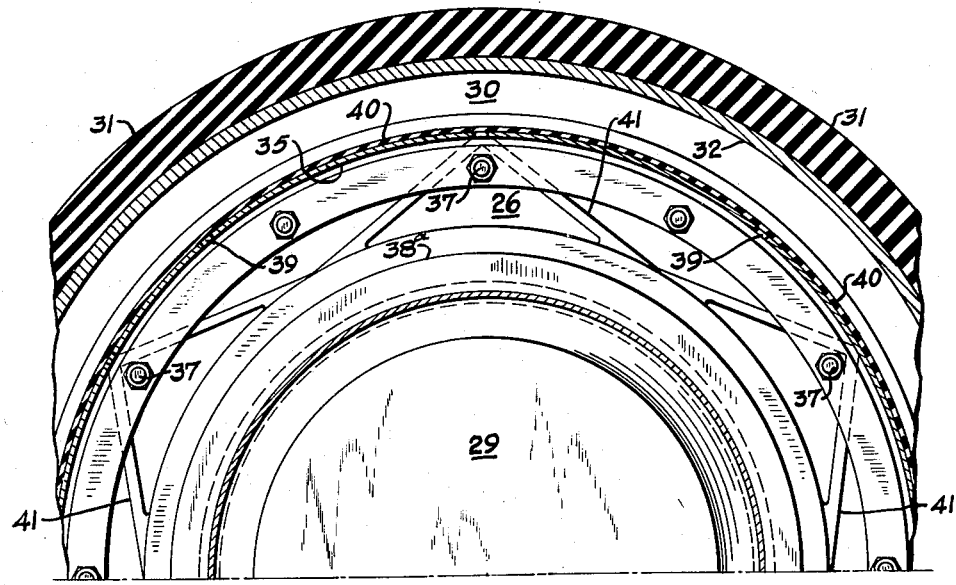

2,925,845

TIRE FOR VEHICLES, COMPOSED OF TWO CONCENTRIC ANNULAR CHAMBERS

Francesco Merz, Turin, Italy; Maria Merz, Mario Merz, and Marina Merz, heirs of said Francesco Merz, deceased, assignors to Curtiss-Wright Corporation, New York, N.Y., a corporation of Delaware Application September 7, 1955, Serial No. 532,958

Claims priority, application Italy September 15, 1954

6 Claims. (Cl. 152—339)

The present invention has for its object a tire for vehicles, composed of two concentric annular chambers.

A first object of the invention is to reduce or eliminate the jolting transmitted by the irregularities of the roadways to the vehicle through the tires that are placed round the rims of the wheels. Said jolting is particularly resented, notwithstanding the elastic suspension and the absorbers with which the vehicle is provided, in the large passenger cars (Pullman).

Low pressure tires are known, which serve the purpose of improving the springing of the vehicle; but this result is obtained at the cost of an increase of the bearing surface of the tread, an increase of resistance to the steering action, a greater wearing of the rubber, and a reduction of the admissible load on the tire.

The present invention conciliates the relatively high pressure in an outer ring-shaped chamber in contact with the road with a notably lower pressure in a second ring interposed between the outer ring and the wheel, so that the outer ring in contact with the road undergoes, by the action of the load, a deformation within a limit admitted to all effects, while supporting the inner ring over a large curved surface that has no contact with the road, in consequence of which the inner ring needs only such a low air pressure as is required to absorb the shocks and at the same time support the load.

The tire according to the invention, comprising two ring chambers is particularly suitable to give a considerable yield under dynamic load irrespective of the air pressure.

A further object of the invention is to provide a tire giving a certain degree of safety in the case of explosion; in fact, it consists of two distinct resilient chambers, so that one of them will in any event keep working, thus avoiding the disastrous consequences from a rim running in contact with the road.

The invention will now be described by way of an example, not limitative, with reference to two preferred embodiments and the accompanying drawing, in which:

Fig. 1 shows a partial cross section of a tire according to the invention.

Fig. 2 is similar to Fig. 1, but refers to a modification, while

Fig. 3 is a partial longitudinal section corresponding to Fig. 2.

On the drawing two concentric chambers are shown, with an inner ring which hooks together the lips of both chambers and, as it is widened, constitutes the diaphragm. The adoption of the principle of dividing the tire into two concentric annular chambers results in reduced and semi-circular sides capable of resisting air pressure even if not provided with any reinforcement. The radial outward load, as well as the centrifugal force, is in that case taken partly by a ring inside the tread, and partly by the diaphragm, while the inward load is mostly taken up by the diaphragm and the rim and wheel assesmbly.

The chambers may be obtained by means of moulds with a rigid core, with economical advantage. In addition, the inconveniences inherent to a compound formation, such as the separation of plies, the friction from displacement, the excessive heating (by hysteresis) are avoided.

In addition to the advantage of being able to replace only the outer portion of the tire, which is the portion which is subject to wear through road contact, there is the added advantage that material having a different degree of resilience may be used for the inner portion.

The tire may be widened without increasing the height of the section, which avoids the need for twin tires.

In one of the present examples the inner chamber, opened at the larger diameter where it is closed by the diaphragm, encloses the rim and wheel assembly entirely.

In the other example, the inner chamber is split at the centre of the envelope of the wheel and the closing has a lip form, so that the inner chamber is composed of two equal rings disposed side by side. Both solutions avoid any escape of air either from lateral thrust or imperfection of the rim and wheel assembly.

The seal between the lips of the chambers and the diaphragm ring may be ensured by means of packing forced in from without as if by caulking, or alternatively by clamping the lips on to the ring with screws or other devices, operating from the inside, shifting the closing lips.

The internal valve between the two chambers may be formed of holes provided in the diaphragm and closed by a resilient clip slipped over the ring.

According to Fig. 1, the inner chamber 1 is formed by the sides 10 which envelop at 11 the rim 2. The outer chamber 3 is formed by the tread and sides 23, the laps of which are provided with lips 4 as are also the laps of the inner sides 10 with lips 24.

The ring 6, which constitutes the diaphragm between the two chambers, has its edges turned in with which it hooks together the lips 4 and 24 between which the packings 20 are forced, on either side, from without. The ring 6 may be formed by two superimposed rings, united at their central flat portion by soldering or riveting. The packings may be forced in position by means of any suitable tool and extracted by means of tongs taking hold of the extension 12.

At the centre of the ring 6 along its periphery there are formed a few holes 13 closed by the circular rubber flaps 14 fitted on to the outside groove of the ring, which constitutes a simple, but perfectly tight valve. 15 denotes the girdle inside the tread, located in an annular groove of the mould core, which gives a more uniform tread thickness, with advantages concerning the wearing and heating.

The embodiment as shown in Fig. 2 has an inner chamber 26 similar to inner chamber 1, such chamber having sides 27 and 27a which envelop at 28 the rim 29. It also has an outer chamber 30 formed by the tread and sides 31 and having a girdle 32 as in the showing of Fig. 1. The lips 33, and 34 and 34a of the chambers are clamped onto the ring 35 by means of two flange like rings 36 with bolts 37, the spanner for same being introduced through the closing lips 38 and 38a. The ring 35 may have a series of holes 39 which are closed by flap 40 to form a tight valve as in the first form of embodiment.

The resistance to the effects of air pressure, transverse flexure and torsion of the tire may be increased by internal radial or tangential flanges or webs.

These reinforcements, possibly strengthened by metal reinforcements, indicated by 41 also in Fig. 3, are obtainable by providing deep grooves or slots in the mould cores.

Preferably the two chambers of the tire are inflated to a different pressure, which is obtained by inflating both chambers to a high pressure, and letting then escape a part of the air contained in the inner chamber.

While the characteristic feature of the novel tire is the combination of two annular chambers under different pressure it is wished to claim every single characteristic fit for use in any other way. It is equally obvious that the indication of the use for vehicles does not exclude any other use.

The present invention is not anticipated by the known tires having in their interior a perforated or extensible envelope or an envelope formed by a plurality of compartments, always for safety purposes, which however neither improves the suspension nor offers the other advantages of the present invention.

I claim:

1. In an assembly of a plurality of pneumatic-tire sectional casings, having an annular bottom shaped for mounting upon a wheel and a road engaging surface tread, at least one inner-casing section concentrically mounted over said wheel, said inner-casing section having an open top with a pair of annular rims; at least one outer-casing section concentrically mounted over said at least one inner section, said outer-casing section having an open bottom with a pair of annular rims; the pairs of said rims of said inner-casing section and of said outer-casing section having conforming shapes for match-mounting respectively in abutting position with an annular diaphragm band, an annular diaphragm band having rims spaced and shaped to hold the said pairs of said casing rims, and means to clamp together said pair of rims of said inner-casing section, with the said pair of rims of said outer-casing section, and with the said diaphragm rims, in an air-tight abutment.

2. An assembly as claimed in claim 1, wherein said annular diaphragm-band includes a fluid valve connecting the compartments formed by the said outer- and the said inner-casing sections.

3. An assembly as claimed in claim 1, wherein said annular diaphragm includes a differential pressure valve connecting the compartments formed by the said outer- and the said inner-casing sections.

4. An assembly of a plurality of pneumatic-tire sectional casings as claimed in claim 1, wherein said annular diaphragm-band is made of a stiff material.

5. An assembly as claimed in claim 1, wherein the said pair of said rims of the inner-casing section is shaped to overlap in abutment the said pair of said rims of said outer section and wherein each of said rims of said diaphragm-band forms an annular channel of a size and shape matching said overlapping pairs of said rims of said section casings.

6. An assembly as claimed in claim 1, wherein the said pairs of said rims of said inner- and said outer-casing sections are shaped for mounting in radial abutment with the rims of said outer-casing superimposed over said rims of said inner-casing, and wherein said diaphragm has a pair of annular clamping rims on each side, shaped to receive the said pairs of superimposed rims of said two section casings and means to clamp said rims of said two pairs of said section casings together with said rims of said annular diaphragm to form an air-tight outer and inner compartment.

References Cited in the file of this patent
UNITED STATES PATENTS

| | | |
|---|---|---|
| 473,034 | Ulbricht | Apr. 19, 1892 |
| 2,618,308 | Khalil | Nov. 18, 1952 |

FOREIGN PATENTS

| | | |
|---|---|---|
| 3,626 | Great Britain | of 1895 |